United States Patent
Rose

(10) Patent No.: US 9,042,216 B2
(45) Date of Patent: May 26, 2015

(54) LOOP PREVENTION MECHANISM FOR ETHERNET RING PROTECTION

(75) Inventor: Laurence Rose, Oak Park, CA (US)

(73) Assignee: Alcatel Lucent, Boulogne-Billiancourt (FR)

(*) Notice: Subject to any disclaimer, the term of this patent is extended or adjusted under 35 U.S.C. 154(b) by 1438 days.

(21) Appl. No.: 12/422,281

(22) Filed: Apr. 12, 2009

(65) Prior Publication Data
US 2009/0316571 A1 Dec. 24, 2009

Related U.S. Application Data

(60) Provisional application No. 61/132,714, filed on Jun. 20, 2008.

(51) Int. Cl.
*G01R 31/08* (2006.01)
*H04L 12/24* (2006.01)
*H04L 12/437* (2006.01)

(52) U.S. Cl.
CPC ............ *H04L 41/0604* (2013.01); *H04L 41/06* (2013.01); *H04L 12/437* (2013.01)

(58) Field of Classification Search
CPC . H04L 41/0604; H04L 12/006; H04L 12/437; H04L 12/00; H04L 12/08; H04L 12/26; H04L 41/06; H04L 41/0654; H04L 45/28

USPC ......... 370/222, 223, 216, 218, 405, 229, 230, 370/235
See application file for complete search history.

(56) References Cited

U.S. PATENT DOCUMENTS

| | | | | |
|---|---|---|---|---|
| 5,282,200 A | * | 1/1994 | Dempsey et al. | 370/245 |
| 6,820,210 B1 | * | 11/2004 | Daruwalla et al. | 714/4.1 |
| 2008/0037436 A1 | * | 2/2008 | Liu | 370/250 |

OTHER PUBLICATIONS

ITU-T Y.1731 "OAM Functions and Mechanisms for Ethernet Based Networks", May 2006, pp. 1-80.
ITU-T G.8032/Y.1344 "Ethernet Ring Protection Switching" Jun. 2008, pp. 1-40.
IEEE Std. 802.1Q-2005 "IEEE Standard for Local and Metropolitan Area Networks—Virtual Bridged Local Area Networks" May 19, 2006, pp. 1-303.

* cited by examiner

*Primary Examiner* — Anh Ngoc Nguyen
(74) *Attorney, Agent, or Firm* — Capitol Patent & Trademark Law Firm, PLLC

(57) ABSTRACT

A node (bridge, switch, router) and method are described herein that implement a loop prevention mechanism for Ethernet ring protection. In one embodiment, the loop prevention mechanism can enhance the current draft of the standard ITU-T G.8032 Ethernet Ring Protection Switching.

16 Claims, 18 Drawing Sheets

LOOP PREVENTION MECHANISM FOR ETHERNET RING PROTECTION

CLAIMING BENEFIT OF PRIOR FILED U.S. APPLICATION

This application claims the benefit of U.S. Provisional Application Ser. No. 61/132,714 entitled "Loop Prevention Mechanism for the ITU Standard ITU-T G.8032 Ethernet Ring Protection" filed on Jun. 20, 2008 the contents of which are hereby incorporated by reference herein.

TECHNICAL FIELD

The present invention relates in general to local and metropolitan area networks and, in particular, to a node (bridge, switch, router) that implements a loop prevention mechanism for Ethernet ring protection. In one embodiment, the loop prevention mechanism can enhance the current draft of standard ITU-T G.8032 Ethernet Ring Protection Switching.

BACKGROUND

The following abbreviations are herewith defined, at least some of which are referred to within the following description of the state-of-the-art and the present invention.
APS Automatic Protection Switching
CC Continuity Check
CFM Connectivity Fault Management
ERP Ethernet Ring Protection
ETH Ethernet
FDB Forwarding Database
IEEE Institute of Electrical and Electronics Engineers
ITU International Telecommunication Union
LAN Local Area Network
MAC Media Access Control
MAN Metropolitan Area Network
NR No Request
OAM Operation, Administration and Maintenance
RB RPL Blocked
RPL Ring Protection Link
SF Signal Failure
STP Spanning Tree Protocol
TTL Time to Live
TLV Type Length Value
VLAN Virtual Local Area Network
WTR Wait to Restore Computers are often connected together through a network (e.g., LAN, MAN) that is made up of nodes (bridges, switches, routers) in which it is desirable for data that is being transmitted from one bridge to be constrained to follow a loop-free path. Unfortunately, the previous draft standard of ITU-T G.8032 Ethernet Ring Protection Switching exhibited the possibility for some data loops to be created when old information circulates within the ring. The most critical problem is when old information interpretation allows the creation of a loop of data traffic that may last several minutes. This problem where a data loop can be formed if a node wrongly interprets an old message is demonstrated in an exemplary scenario discussed in detail below with respect to FIGS. 1A-1K (PRIOR ART).

Prior to describing this exemplary scenario, a brief discussion is provided next to promote an understanding of some of the main terms and concepts associated with the ITU-T G.8032 standard (the contents of which are incorporated by reference herein) that may be relevant to the present discussion. Of course, those people who are skilled in the art will already be well aware of these main terms and concepts commonly associated with the protocol of ITU-T G.8032.

The ITU-T G.8032 standard's Objectives and Principles are highlighted here:
Use of standard 802 MAC and OAM frames around the ring.
Uses standard 802.1Q (and amended Q bridges), but with the xSTP disabled.
Ring nodes support standard FDB MAC learning, forwarding, flush behavior and port blocking/unblocking mechanisms.
Prevents loops within the ring by blocking one of the links (either a pre-determined link or a failed link).
Monitoring of the ETH layer for discovery and identification of SF conditions.
Protection and recovery switching within 50 ms for typical rings.
Total communication for the protection mechanism should consume a very small percentage of total available bandwidth.

The ITU-T G.8032 standard's Terms and Concepts are highlighted here:
ERP—The common name for the ITU-T G8032 draft standard.
RPL—Link designated by mechanism that is blocked during Idle state to prevent loop on bridged ring.
RPL Owner—Node connected to RPL that blocks traffic on RPL during idle state and unblocks during protected state.
Link Monitoring—Links of ring are monitored using standard ETH CC OAM messages (CFM).
SF—Signal Fail is declared when ETH trail signal fail condition is detected.
NR—No Request is declared when there are no outstanding conditions (e.g., SF, etc.) on the node.
Ring APS (R-APS) Messages—Protocol messages defined in G.8032 and ITU-T Y.1731 entitled "OAM Functions and Mechanisms for Ethernet Based Networks" (the contents of which are incorporated by reference herein).
APS Channel—Ring-wide VLAN used exclusively for transmission of OAM messages including R-APS messages.
TLV—Optional information that may be encoded as a type-length-value or a TLV element and used within data communication protocols and particularly within ITU-T Y1731 onto which the ITU-T G.8032 has based its frame format for R-APS. The type and length fields are fixed in size (typically 1-4 bytes), and the value field is of variable size. These fields are used as follows:
  Type: a numeric code which indicates the kind of field that this part of the message represents.
  Length: the size of the value field (typically in bytes).
  Value: variable sized set of bytes which contains data for this part of the message.
Some of the advantages of using a TLV representation are:
TLV sequences are easily searched using generalized parsing functions.
New message elements which are received at an older node can be safely skipped and the rest of the message can be parsed.
TLV elements are typically used in a binary format which makes parsing faster and the data smaller.

The ITU-T G.8032 standard specifies the use of different timers to avoid race conditions and unnecessary switching operations. These timers are highlighted here:
WTR Timer—Used by RPL Owner to verify that the ring has stabilized before blocking the RPL after SF Recovery. The WTR timer may be configured by the operator in 1 minute steps between 5 and 12 minutes; the default value is 5 minutes.

Hold-off Timers—Used by underlying ETH layer to filter out intermittent link faults, where faults will only be reported to the ring protection mechanism if this timer expires.

The ITU-T G.8032 standard's Controlling the Protection Mechanism is highlighted here:

Protection switching triggered by:
Detection/clearing of Signal Failure (SF) by ETH CC OAM.
Remote requests over R-APS channel (Y.1731).
Expiration of G.8032 timers.
R-APS requests control the communication and states of the ring nodes:
Two basic R-APS messages specified—R-APS(SF) and R-APS(NR).
RPL Owner may modify the R-APS(NR) indicating the RPL is blocked—R-APS(NR,RB).
Ring nodes may be in one of two states:
Idle—normal operation, no link/node faults detected in ring.
Protecting—Protection switching in effect after identifying a signal fault.

The ITU-T G.8032 standard's link failure scenario is highlighted here:
1. Link/node failure is detected by the nodes adjacent to the failure.
2. The nodes adjacent to the failure will block the failed link and report this failure to the ring using R-APS (SF) message.
3. R-APS (SF) message triggers:
RPL Owner unblocks the RPL.
All nodes perform FDB flushing.
4. Ring is in protection state.
5. All nodes remain connected in the logical topology.

The ITU-T G.8032 standard's link failure recovery scenario is highlighted here:
1. When the failed link recovers, the traffic is kept blocked on the nodes adjacent to the recovered link.
2. The nodes adjacent to the recovered link transmit RAPS (NR) message indicating they have no local request present.
3. When the RPL Owner receives RAPS(NR) message it starts the WTR timer.
4. Once the WTR timer expires, RPL Owner blocks RPL and transmits a R-APS (NR, RB) message.
5. Nodes receiving the message perform a FDB Flush and unblock their previously blocked ports.
6. Ring is now returned to Idle state.

Other useful information: the ERP uses the R-APS messages to manage and coordinate the protection switching. The R-APS messages (which are continuously repeated) and the OAM common fields are well known to those skilled in the art and are defined in ITU-T Y.1731.

Referring to FIGS. 1A-1K (PRIOR ART), there are illustrated several diagrams of an exemplary network 100 at different steps 1A-1L which are used to help describe how a node (e.g., bridge, switch, router) can wrongly interpret an old message which leads to the formation of an undesirable data loop. The discussion below first describes how the bridge can wrongly interpret an old message which leads to the formation of the undesirable data loop then a discussion is provided to explain the deficiencies of the current ITU-T G.8032 standard which proposes to use a guard timer in an attempt to prevent the formation of the undesirable data loop. The different steps 1A-1K respectively correspond to FIGS. 1A-1K.

1A. Assume the exemplary network 100 has a ring of six nodes that are numbered from 1 to 6 and called node 1 to node 6, respectively. The node 1 is the RPL owner.

1B. Assume node 1 periodically sends R-APS1 (NR,RB) messages reflecting its idle state, across the ring (as per standard). Assume node 1 is blocking a port 102 to RPL link 104 to prevent a loop (as per standard). Assume all nodes 1-6 are in idle states.

1C. Assume there is a failure 106 on link 108 between node 5 and node 6.

1D. Node 5 and node 6 respectively block ports 110 and 112 on failed link 108 and send R-APS(SF) messages when they transition from the idle state to the protection state (as per standard).

1E. Assume the link 108 is up again between node 5 and node 6. Node 5 and node 6 send R-APS(NR) messages and remain in the protection state (as per standard).

1F. Assume the RPL owner (node 1) receives the R-APS (SF) message sent by node 5 or node 6 during step 1D. The RPL owner (node 1) unblocks the non failed RPL port 102 and goes from the idle state into the protective state.

1G. Assume the RPL owner (node 1) receives a R-APS (NR) message sent from node 5 or node 6 during step 1E. The RPL owner (node 1) starts a WTR 114 and remains in the protective state (as per the standard).

1H. Assume that the WTR 114 expires, the RPL owner (node 1) blocks the RPL port 102 again and goes back to the idle state. The RPL owner (node 1) periodically sends R-APS2(NR,RB) messages.

1I. Node 5 and node 6 receive the R-APS2(NR,RB) message from step 1H, unblock the non failed ports 110 and 112 and transition from the protection state to the idle state (as per standard).

Steps 1H and 1I are the expected sequence of steps but a non-expected sequence of steps 1J and 1K could occur after step 1G which would lead to the undesirable creation of the data loop in the network 100. The problematical and un-expected sequence of steps 1J and 1K are as follows:

1J. The WTR timer 114 is still running at RPL owner (node 1).

1K. Node 5 and node 6 receive the R-APS1(NR,RB) message from step 1A, unblock the non-failed ports 110 and 112 and transition from the protection state to the idle state (as per standard).

Steps 1J and 1K are possible if there is a delay in transmitting messages from node 1 to node 5 because of, for example, congestion/queueing or software processing (if trap and forward in software). In this situation, the R-APS1 (NR,RP) message from step 1A could still be transiting over the ring while the RPL owner (node 1) was already in the protective state. In this case, the RPL owner (node 1) would have RPL port 102 forwarding and the nodes 5 and 6 would have their ports 110 and 112 all forwarding at the same time which means there would be an undesirable loop 116 (see FIG. 1K). Unfortunately, this loop 116 cannot be characterized as "transient" which means its duration is very short probably less than 500 ms. Instead, the loop 116 can last for as long as the WTR timer is configured meaning 10 minutes at worse. Of course, this type of situation should prevented at all cost because TTL is not implemented at layer 2 in the network 100 which means that a layer 2 loop 116 would allow some packets to loop forever.

The current solution to this problem is described in the ITU-T G.8032 draft standard. The ITU-T G.8032 attempts to solve this problem by configuring and using a guard timer to ignore certain messages that are susceptible to being too old. To clarify the goal of the guard timer, the standard states the following:

"R-APS messages are continuously repeated with an interval of 5 seconds. This, combined with the R-APS messages forwarding method, in which messages are copied and forwarded at every ring node around the ring, can result in a message corresponding to an old request, which is no longer relevant, being received by ring nodes. The reception of messages with outdated information could result in erroneous interpretation of the existing requests in the ring and lead to erroneous protection switching decisions.

The guard timer is used to prevent ring nodes from receiving outdated R-APS messages. During the duration of the guard timer, all received R-APS messages are ignored by the ring protection control process. This allows that old messages still circulating on the ring may be ignored. This, however, has the side effect that, during the period of the guard timer, a node will be unaware of new or existing ring requests transmitted from other nodes.

The period of the guard timer may be configured by the operator in 10 ms steps between 10 ms and 2 seconds, with a default value of 500 ms. This time should be greater than the maximum expected forwarding delay for which one R-APS message circles around the ring.

The guard timer may be started and stopped. While the guard timer is running the received R-APS Request/State and Status information is not forwarded. If the guard timer is not running, the R-APS Request/State information is forwarded unchanged. "see Section 10.1.5 in ITU-T G.8032 (June 2008).

Also, the guard timer is started on detection of a "local clear SF" meaning that the failure condition has been detected before (link down for example) and is now not happening anymore and is therefore cleared. Thus, when this guard timer is applied to present scenario this means that the user will have to configure the guard timer by estimating how long at worse, a frame can be delayed, so that all previous R-APS (NR,RB) messages are not wrongly interpreted which if done can lead to the creation of some very long lasting loops 116. The guard timer solution is inadequate for the following reasons (for example):

1. A node may discard a valid message, and this may create other kinds of problems. For example, the discarding of an R-APS message carrying a flush (in its status field) can create a loss of connectivity between elements connected through this ring, since the node does not react to this important instruction allowing flooding and addresses to be relearned. This loss of connectivity may last 5 seconds assuming that this is the chosen interval for sending the R-APS message.

2. The guard timer relies on the user setup (because the guard timer is not mandated by the ITU-T G8032 draft standard) of a timer therefore the user needs to understand this kind of complex problem. Then, even if the user configures the guard timer, it can still be too short and the problem can still arise and if it is too long some valid frames can be lost.

Accordingly, there has been and still is a need to address the aforementioned shortcomings and other shortcomings associated with the creation of undesirable loops and the proposed guard timer. These needs and other needs are satisfied by the present invention.

SUMMARY

In one aspect, the present invention provides a method implemented by a node (non RPL owner node) for preventing a creation of a loop within a ring of a network. The method includes the steps of: (a) keeping track of a failure number in the ring of the network; (b) incrementing the kept track failure number when detecting a local failure; (c) updating the kept track failure number with a failure number from a message received from another node in the ring if the failure number in the received message is larger than the kept track failure number; and (d) discarding, while in a protection state, a message received from a ring protection link owner node if the failure number in the received message is less than the kept track failure number, wherein the discarding of the received message from the ring protection link owner node prevents any possible interpretation of old information within the received information which causes the creation of the loop within the ring of the network.

In another aspect, the present invention provides a method implemented by a node (RPL owner node) for preventing a creation of a loop within a ring of a network. The method includes the steps of: (a) keeping track of a failure number in the ring of the network; (b) incrementing the kept track failure number when detecting a local failure; and (c) updating the kept failure number with any failure number in a message received from another node that transitioned from an idle state to a protection state.

In yet another aspect, the present invention provides a non-ring protection link owner node including: (a) a processor; and (b) a memory that stores processor-executable instructions where the processor interfaces with the memory and executes the processor-executable instructions to enable the following: (i) keep track of a failure number in the ring of the network; (ii) increment the kept track failure number when detecting a local failure; (iii) update the kept track failure number with a failure number from a message received from another node in the ring if the failure number in the received message is larger than the kept track failure number; and (iv) discard, while in a protection state, a message received from a ring protection link owner node if the failure number in the received message is less than the kept track failure number, wherein the discarding of the received message from the ring protection link owner node prevents any possible interpretation of old information within the received message which causes the creation of the loop within the ring of the network.

In still yet another aspect, the present invention provides a non-ring protection link owner node including: (a) a processor; and (b) a memory that stores processor-executable instructions where the processor interfaces with the memory and executes the processor-executable instructions to enable the following: (i) keep track of a failure number in the ring of the network; (ii) increment the kept track failure number when detecting a local failure; and (iii) update the kept failure number with any failure number in a message received from another node that transitioned from an idle state to a protection state.

In yet another aspect, the present invention provides a network that includes: (a) a non-ring protection link owner node that has a processor and a memory that stores processor-executable instructions where the processor interfaces with the memory and executes the processor-executable instructions to enable the following: (i) keep track of a failure number in a ring; (ii) increment the kept track failure number when detecting a local failure; (iii) update the kept track failure number with a failure number from a message received from another node in the ring if the failure number in the received message is larger than the kept track failure number; and (iv) discard, while in a protection state, a message received from a ring protection link owner node if the failure number in the received message is less than the kept track failure number, wherein the discarding of the received message from the ring protection link owner node prevents any possible interpretation of old information within the received message which causes the creation of the loop within the ring of the network; and (b) the ring protection link owner node includes a processor and a memory that stores processor-executable instructions where the processor interfaces with the memory and executes the processor-executable instructions to enable the following: (i) keep track of the failure number in the ring; (ii) increment the kept track failure number when detecting a local failure; and (iii) update the kept failure number with any failure number in a message received from one of the non-ring protection link owner nodes that transitioned from an idle state to a protection state.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

In the present invention, the failure detecting node and RPL owner are configured to keep track of new information namely the number of the latest failure in the ring. This new information can be added as a new TLV in the R-APS (SF) message, the R-APS(NR) message and the R-APS(NR,RB) message. In fact, the new information can be added as a new TLV in all messages to simplify coding and to allow for future enhancements even though these messages may or may not be used. The use of the TLV to contain this information also has an advantage of allowing the protocol to be compatible with newer extensions, since when the TLV is not supported by an older protocol version or by some other vendor's equipment it will be ignored by the older protocol or the other vendor's equipment. Here are the principles of operation of the proposed extension to the ITU-T G8032 standard:

All nodes (RPL owner and not RPL owner) add a new TLV with a failure number to all the sent R-APS messages.

Any node shall keep track of a failure number that starts at 0 at node startup in software.

Any node detecting a local failure shall increment its own current failure number.

Figure 1A:
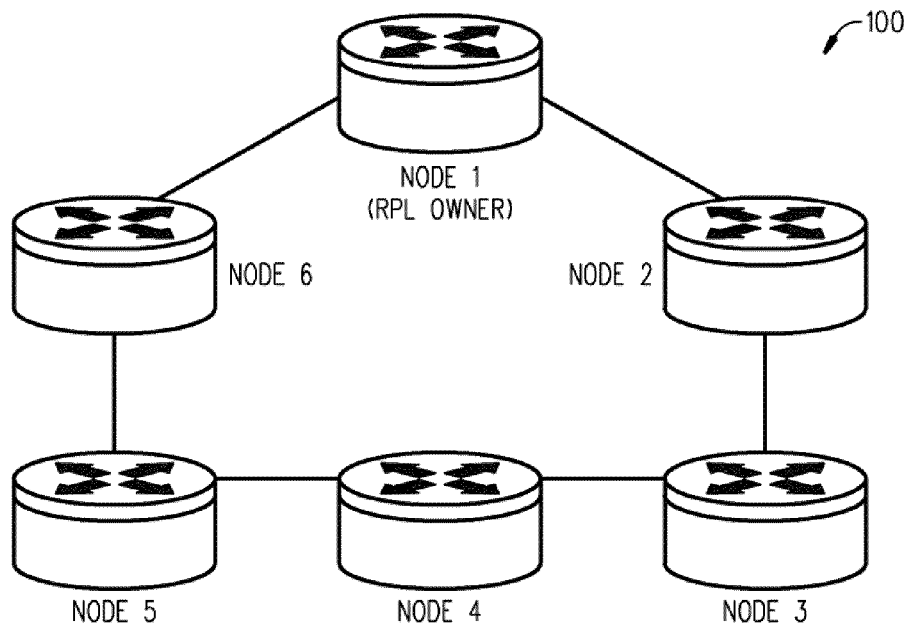
FIGS. 1A-1K (PRIOR ART) are several diagrams of an exemplary traditional network at different times which are used to help describe how a node (e.g., bridge, switch, router) can wrongly interpret an old message which can lead to the problematic formation of an undesirable data loop.
Figure 1B:
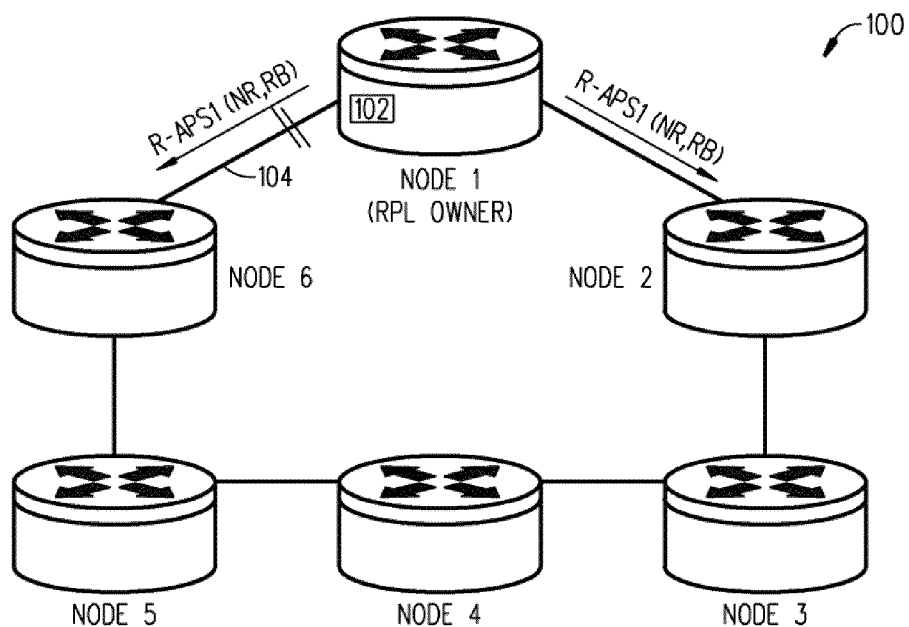
Figure 1C:
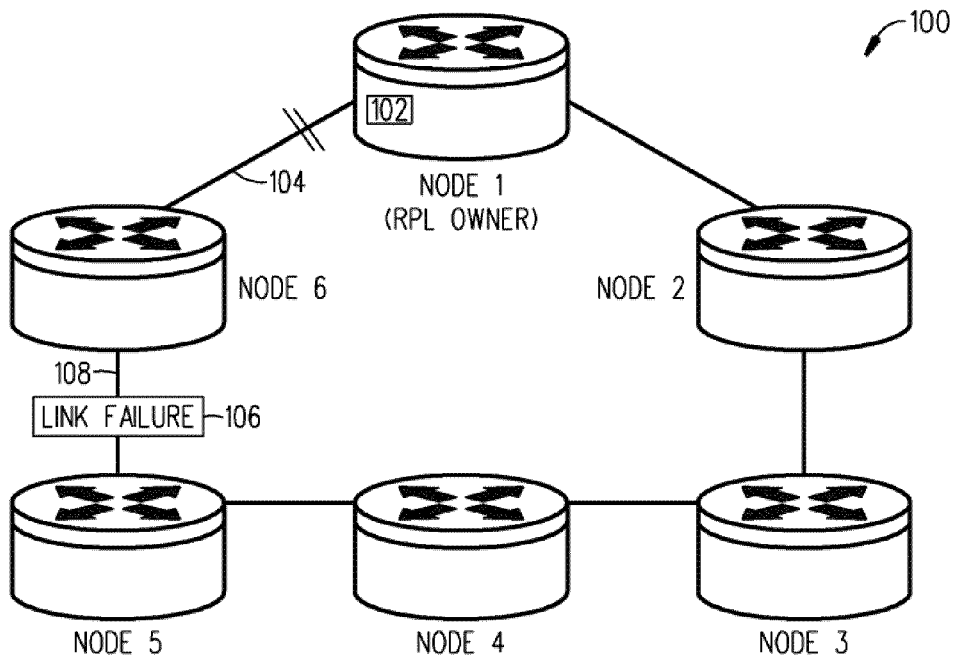
Figure 1D:
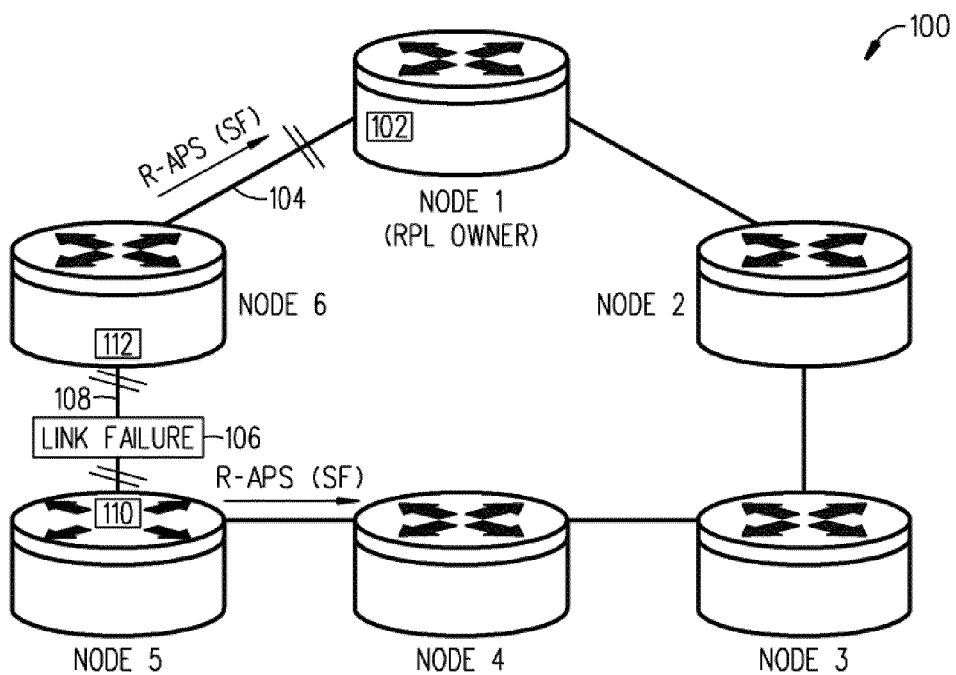
Figure 1E:
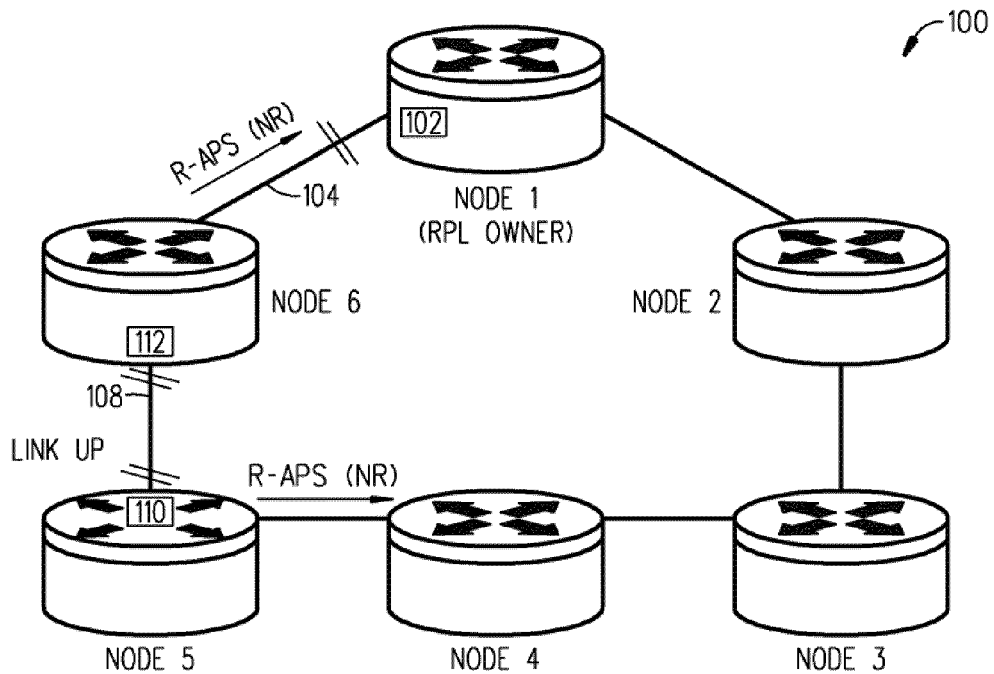
Figure 1F:
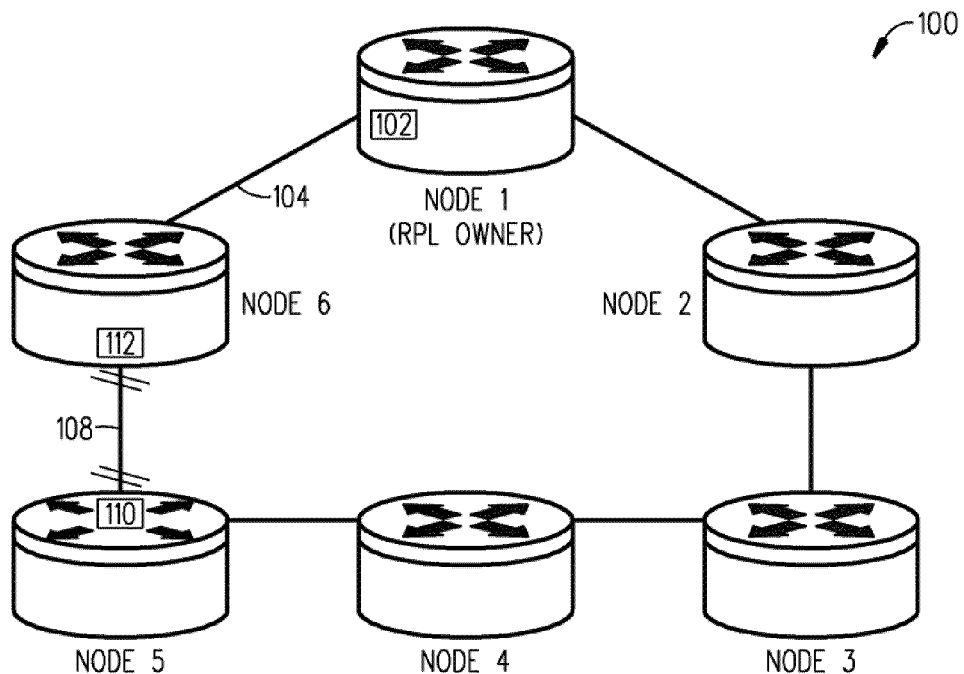
Figure 1G:
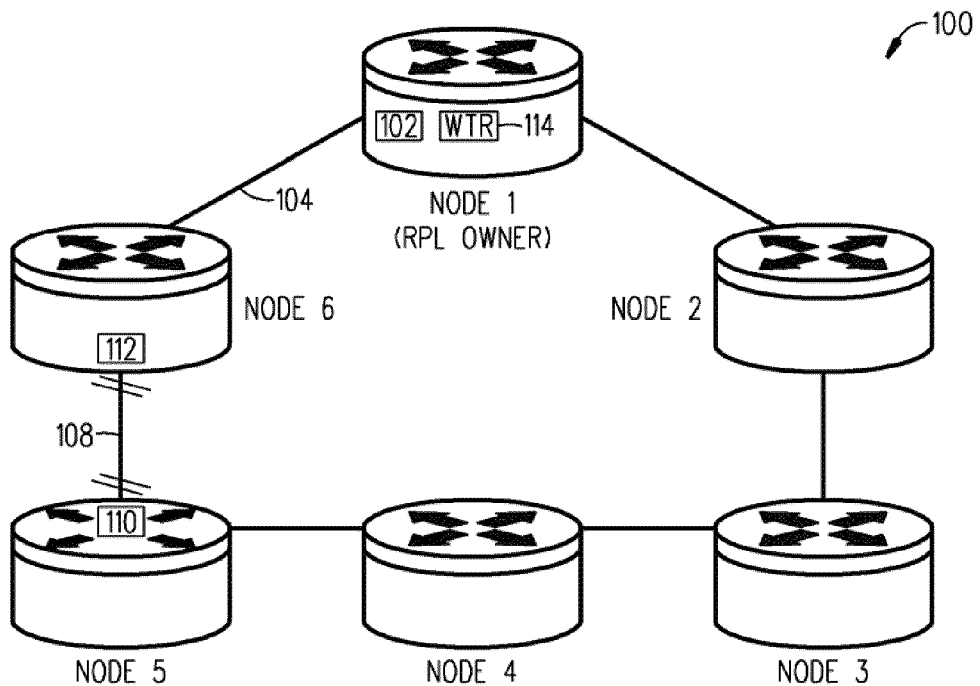
Figure 1H:
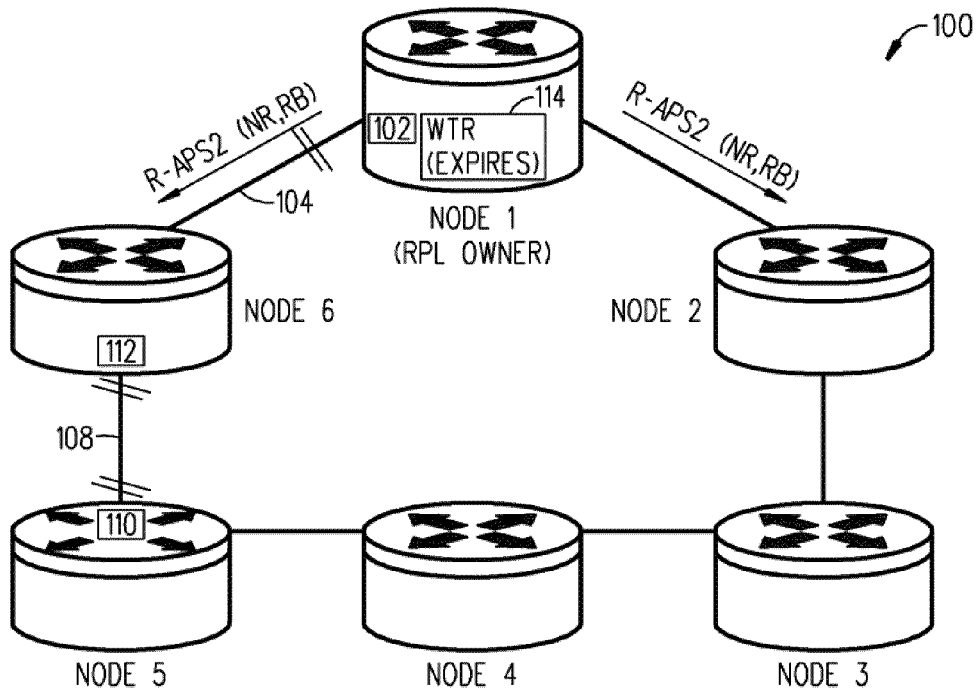
Figure 1I:
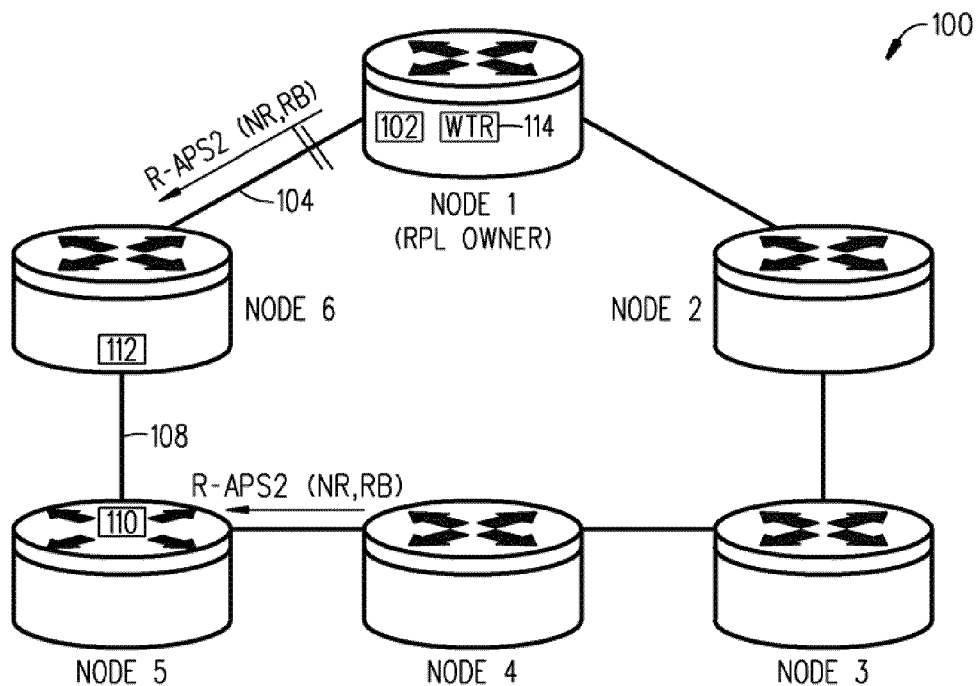
Figure 1J:
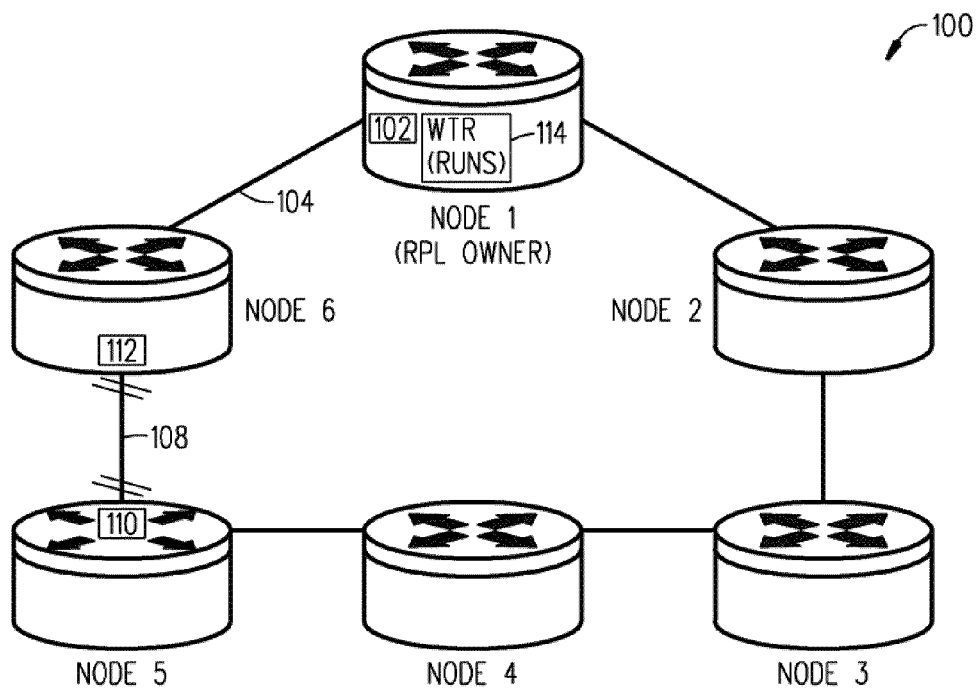
Figure 1K:
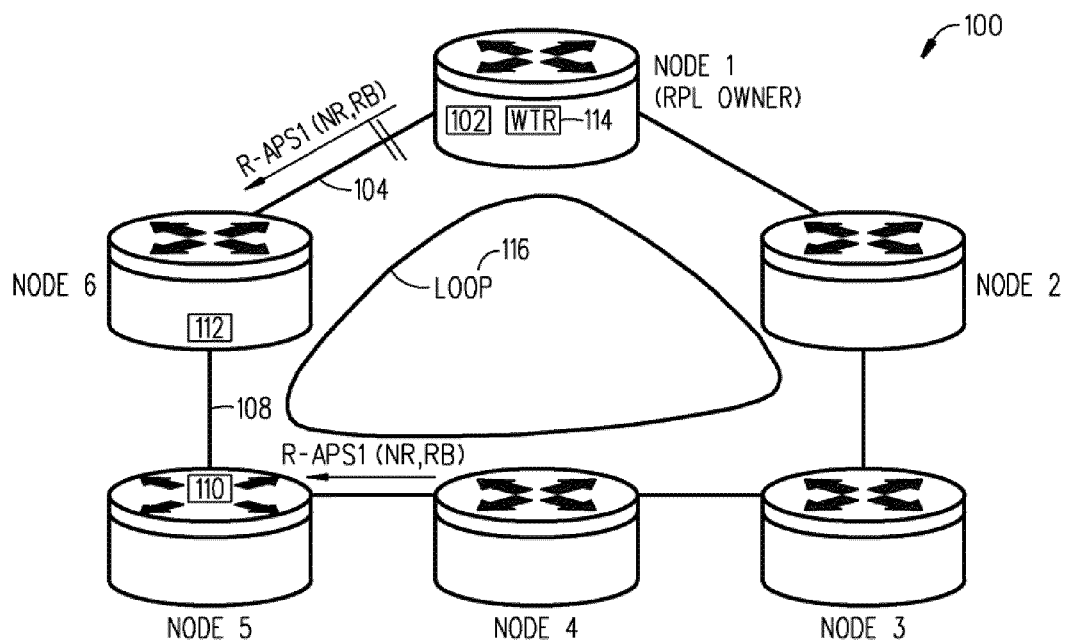
Figure 2A:
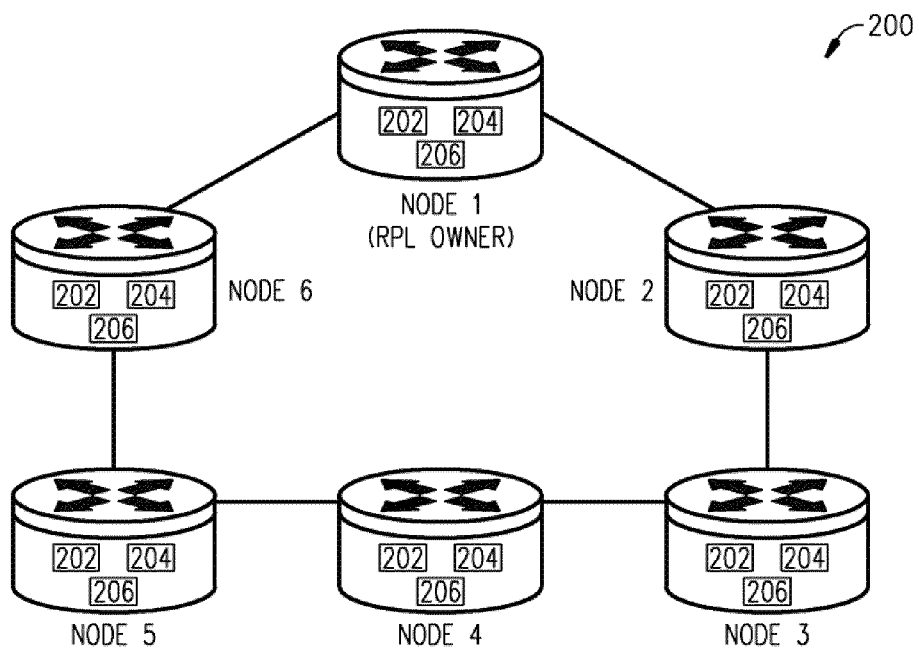
FIGS. 2A-2L, are several diagrams of an exemplary network at different times which are used to help describe how a node (e.g., bridge, switch, router) can address the aforementioned loop problem when there is one link failure in accordance with an embodiment of the present invention.
Figure 2B:
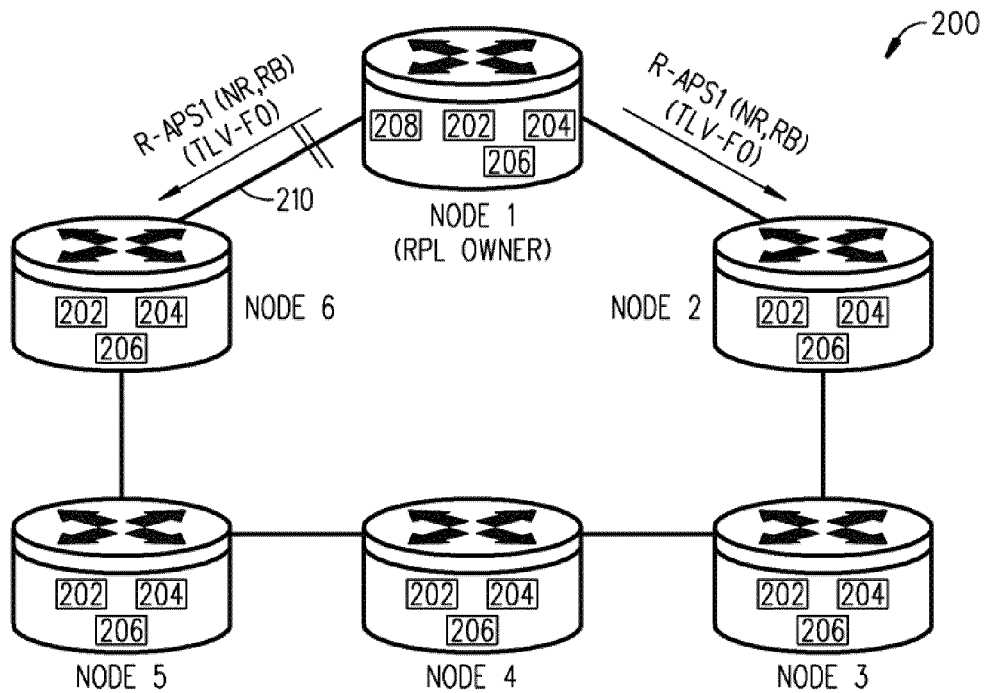
Figure 2C:
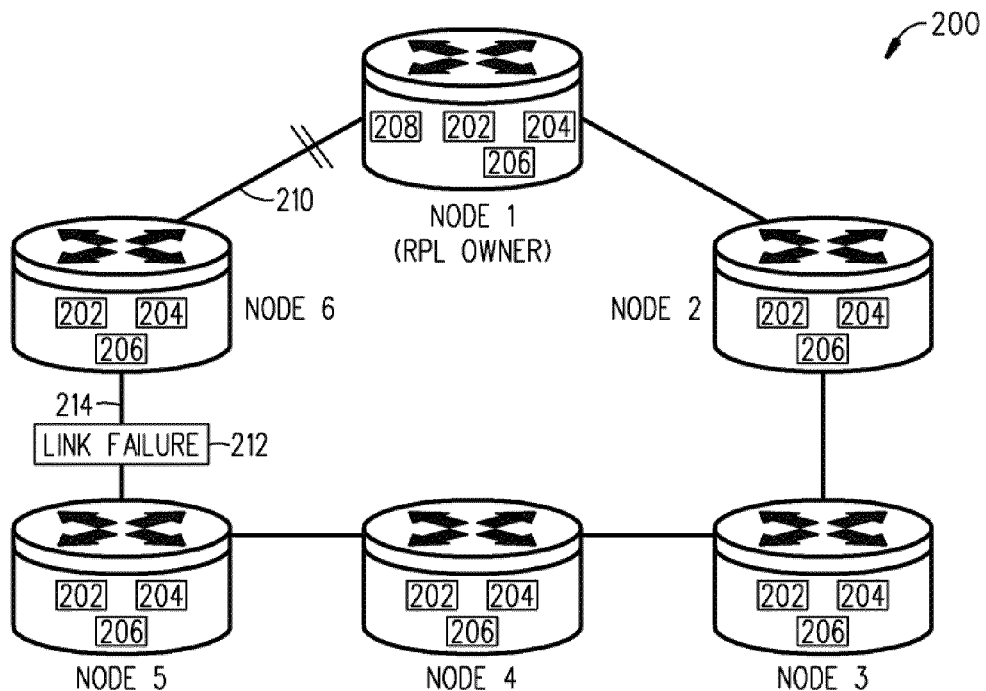
Figure 2D:
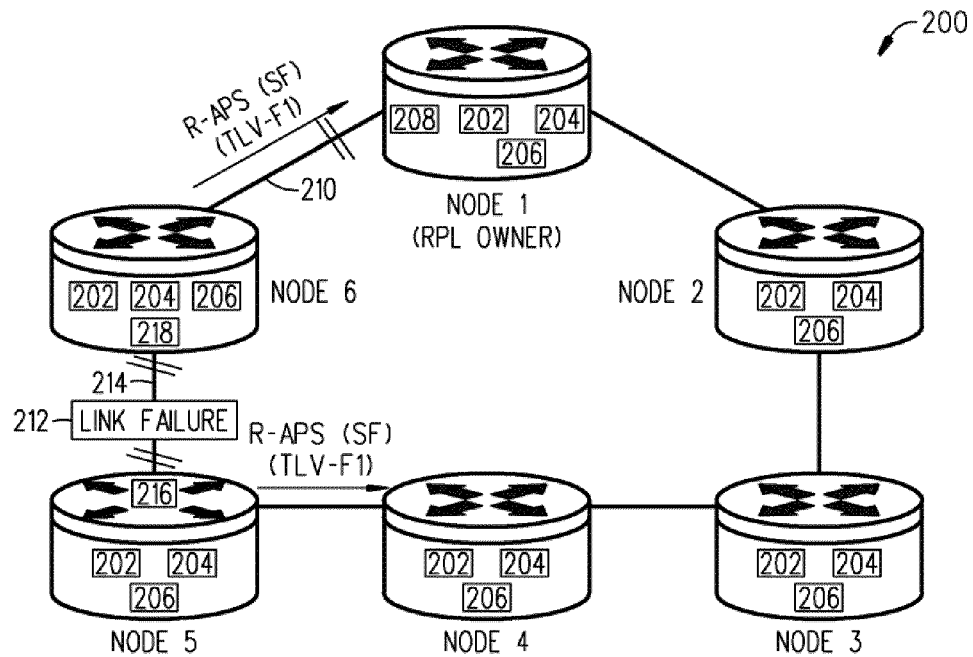
Figure 2E:
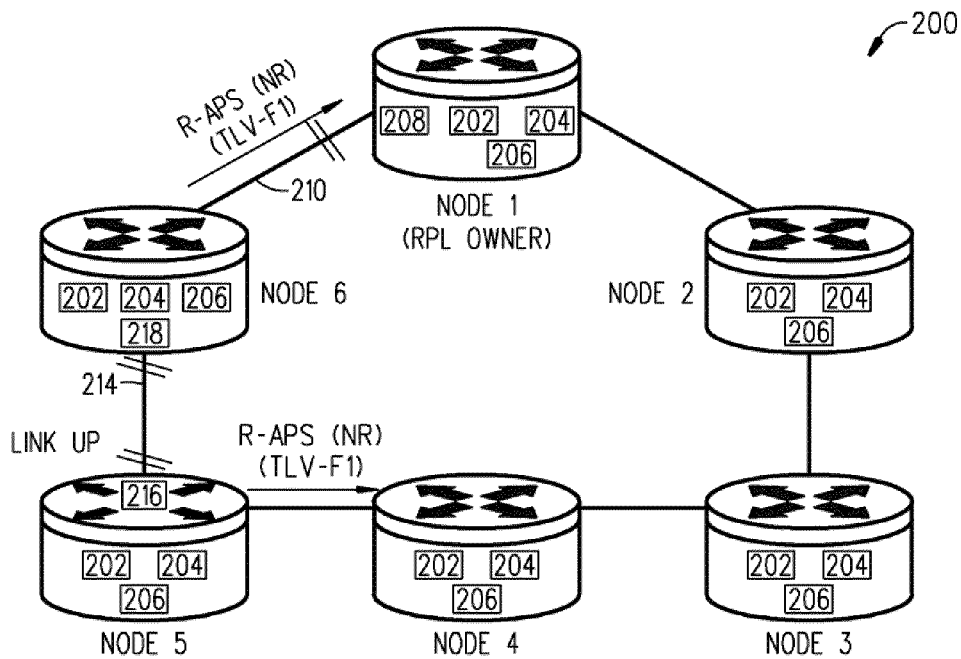
Figure 2F:
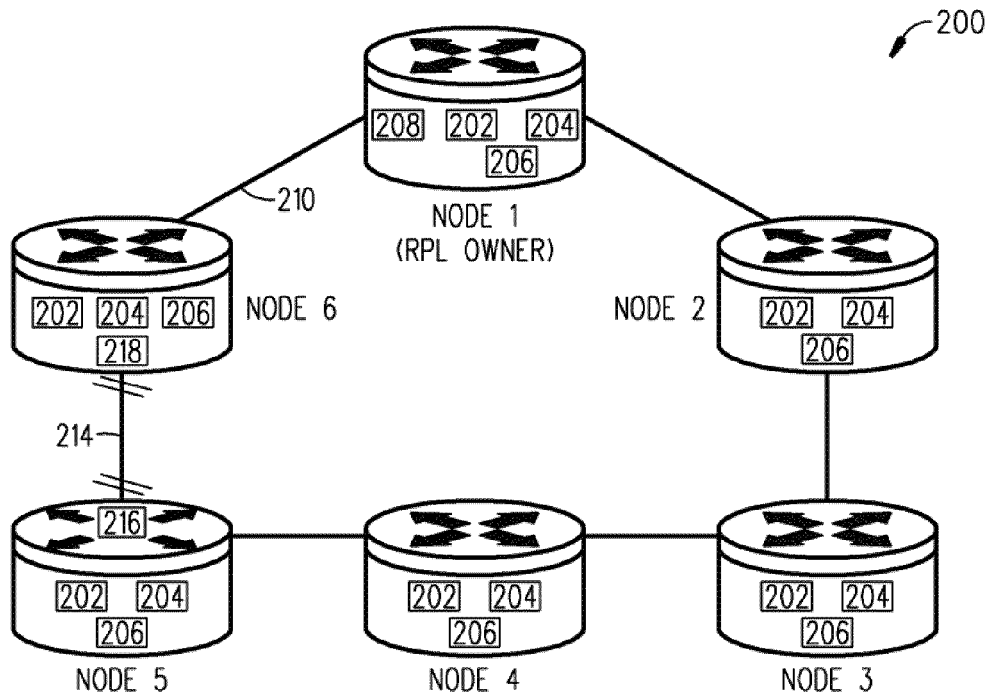
Figure 2G:
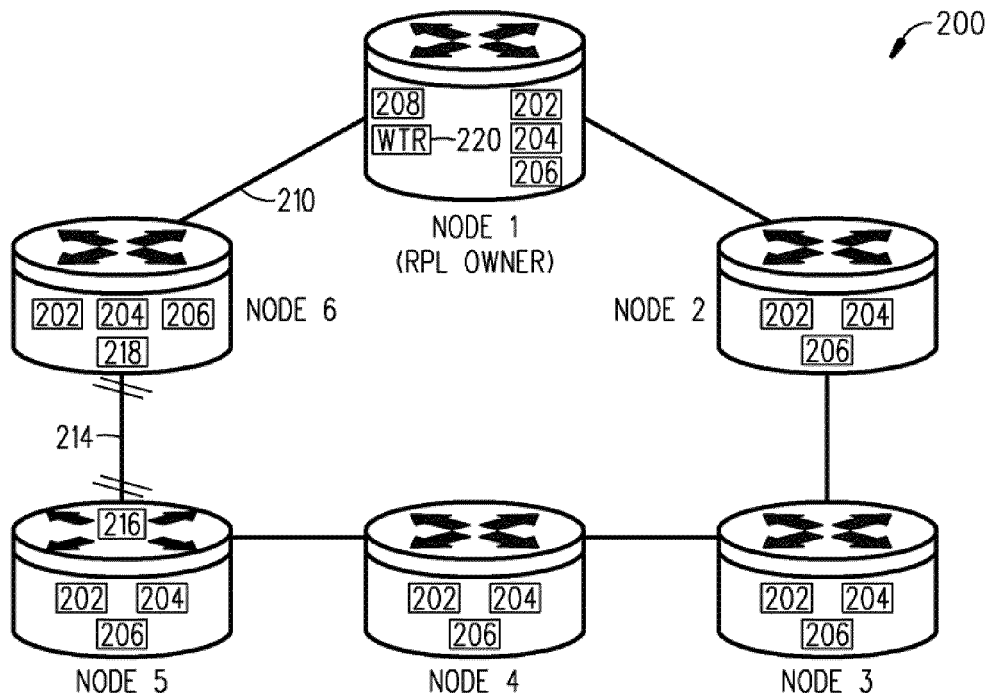
Figure 2H:
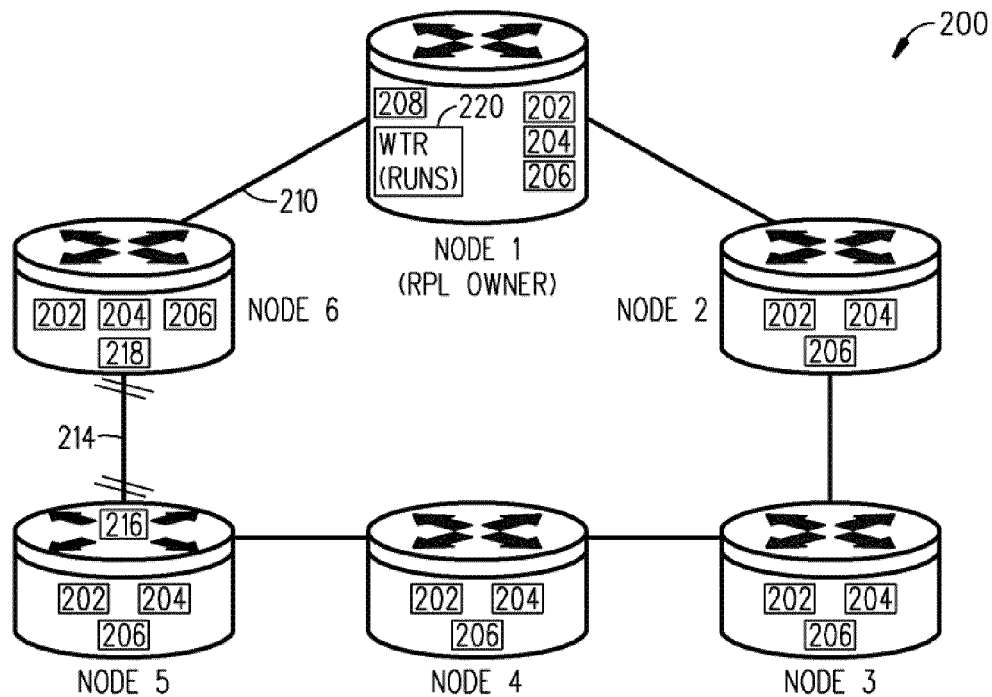
Figure 2I:
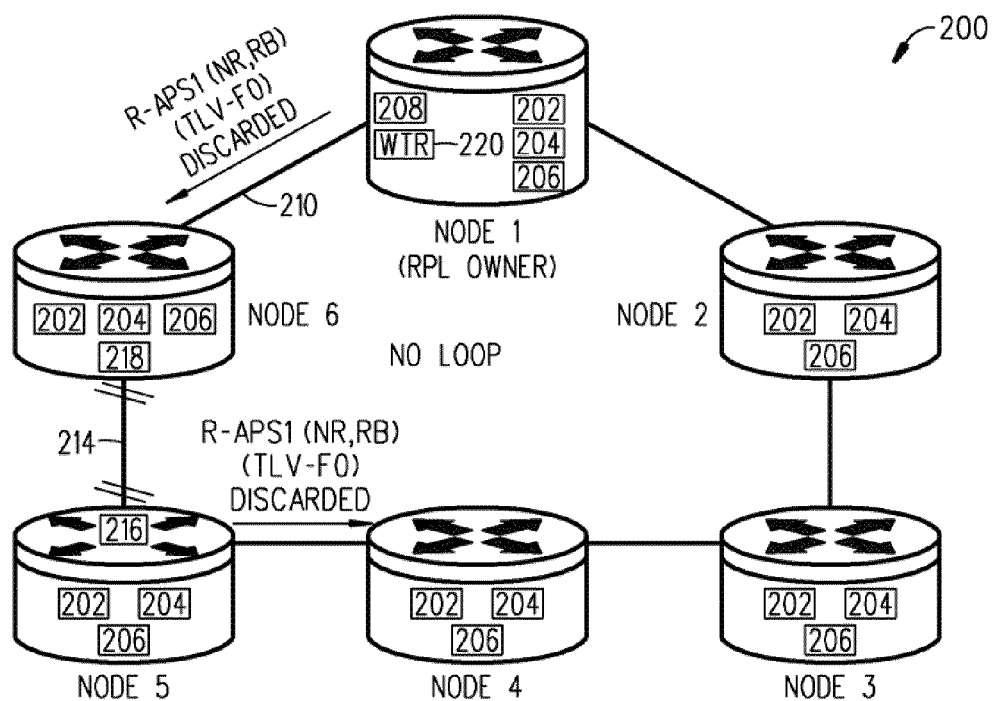
Figure 2J:
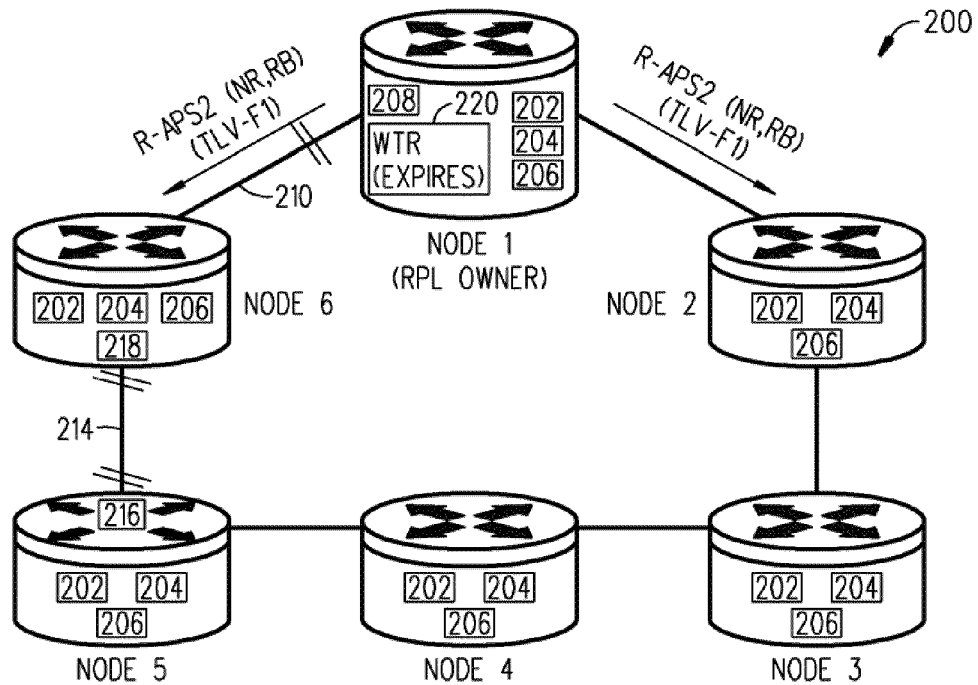
Figure 2K:
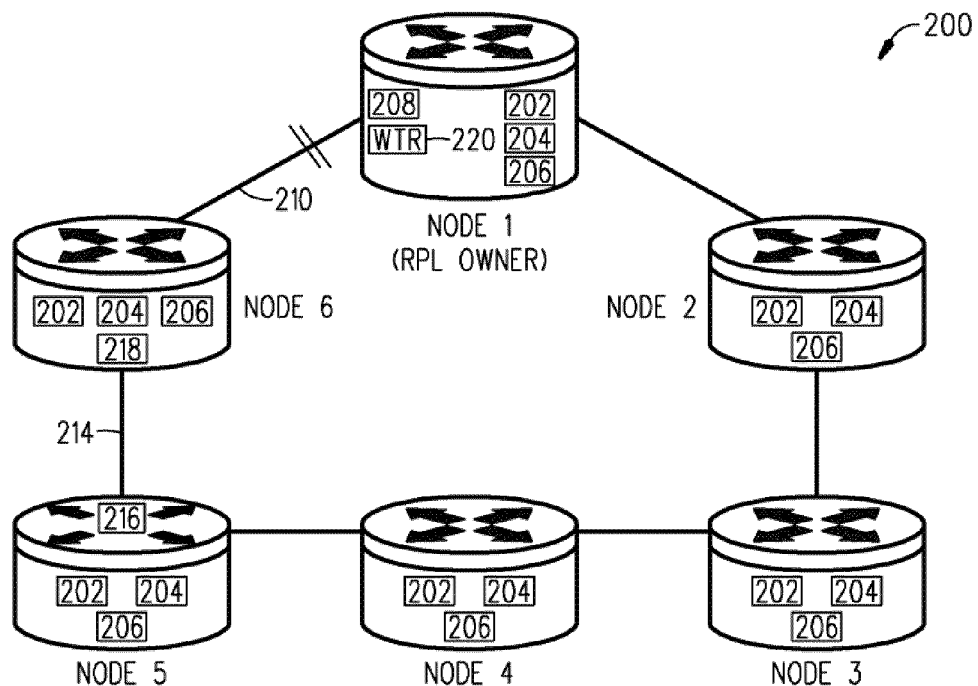
Figure 2L:
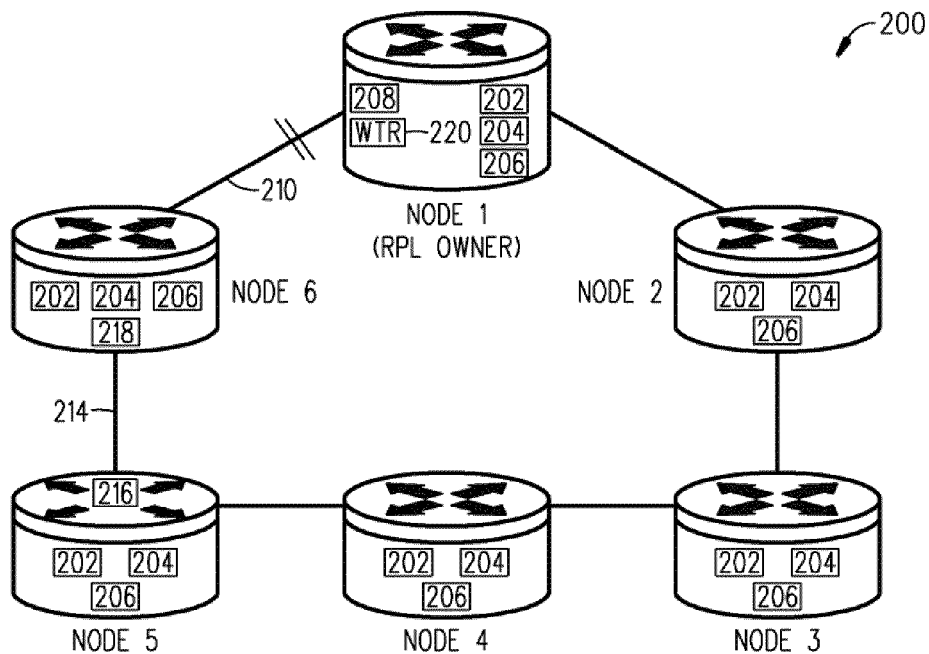
Figure 3A:
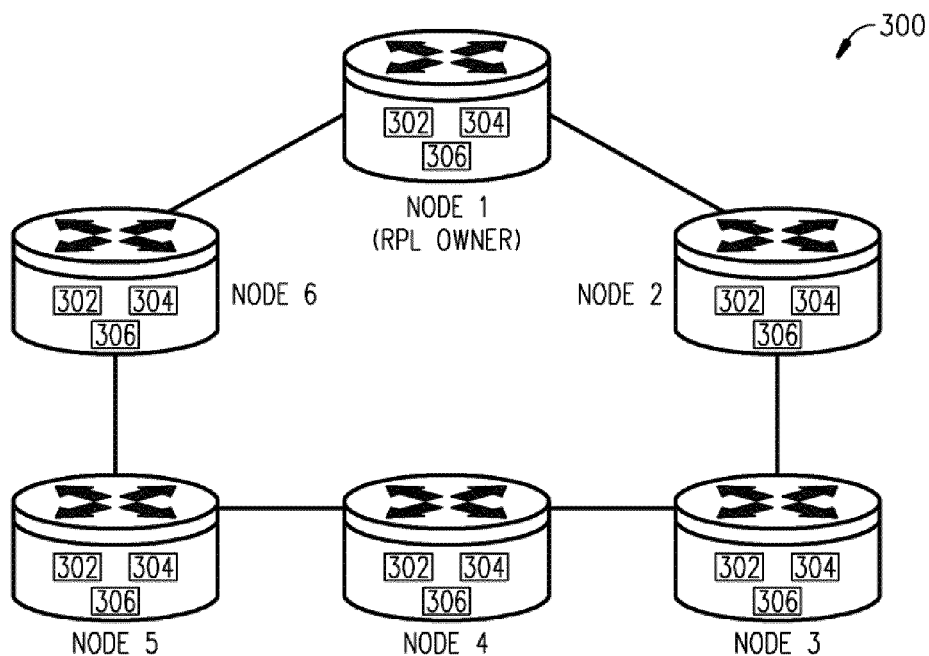
FIGS. 3A-3L, are several diagrams of an exemplary network at different times which are used to help describe how a node (e.g., bridge, switch, router) can address the aforementioned loop problem when there are multiple link failures in accordance with an embodiment of the present invention.
Figure 3B:
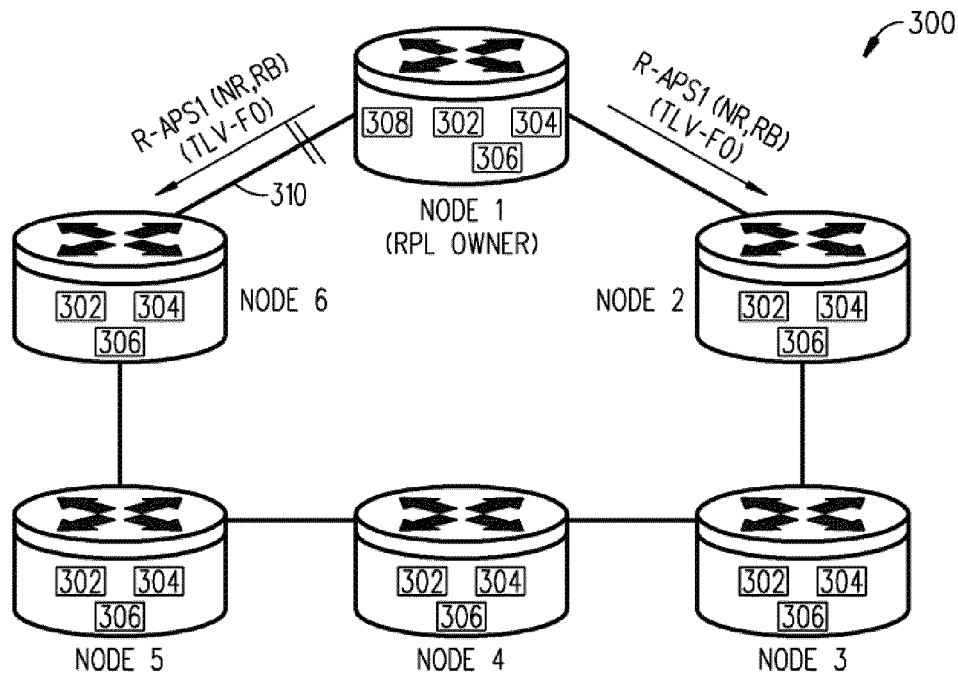
Figure 3C:
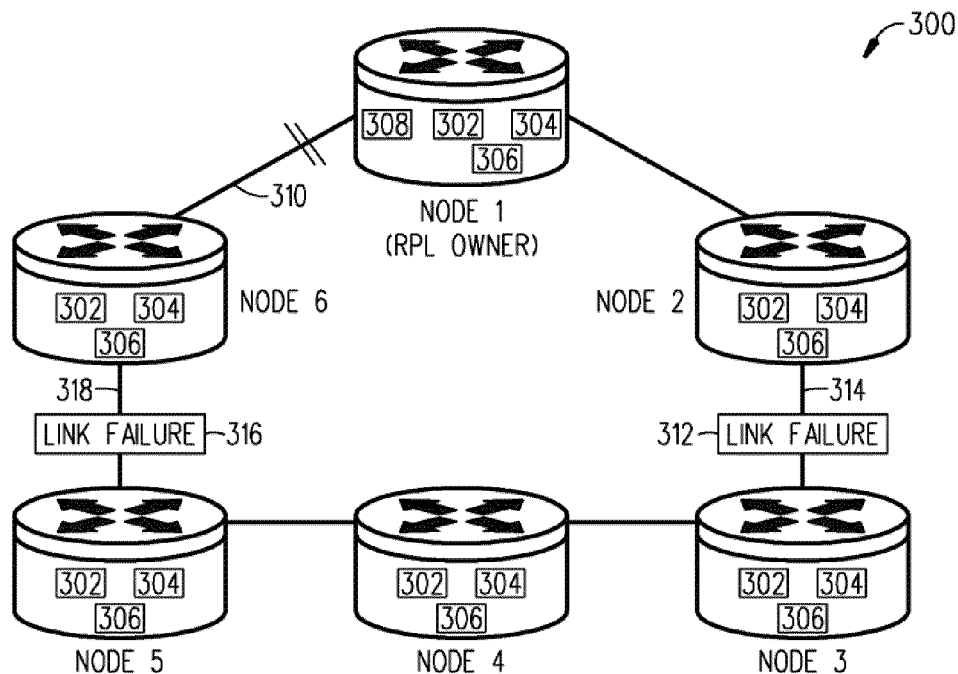
Figure 3D:
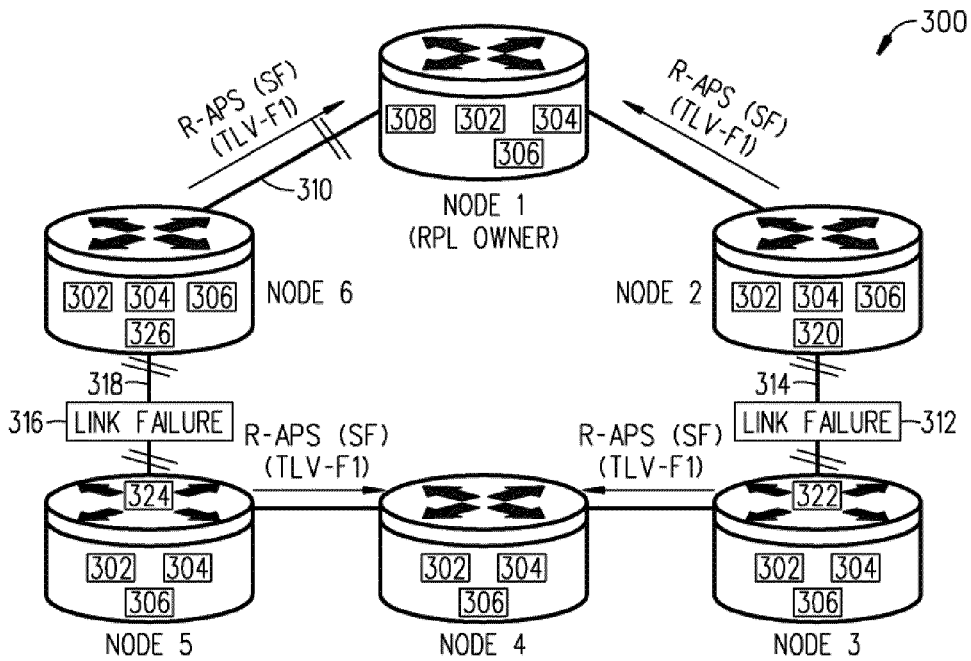
Figure 3E:
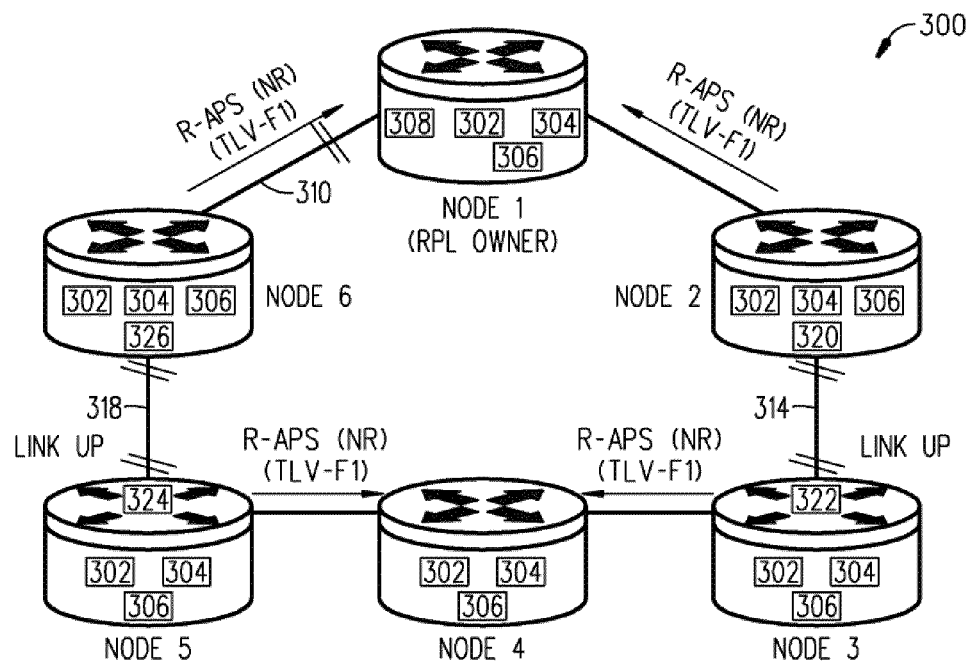
Figure 3F:
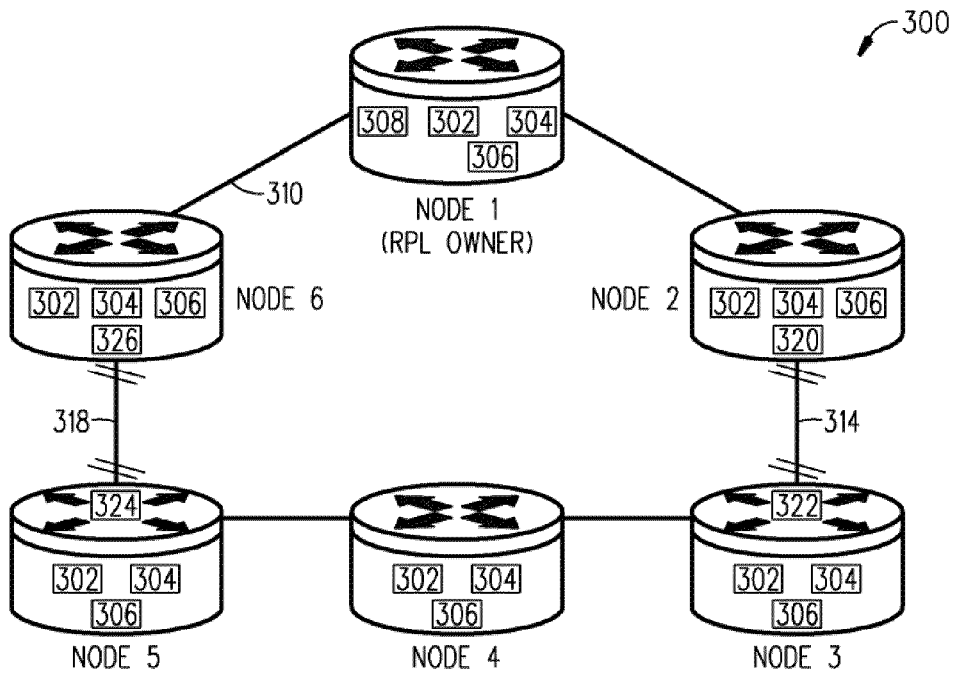
Figure 3G:
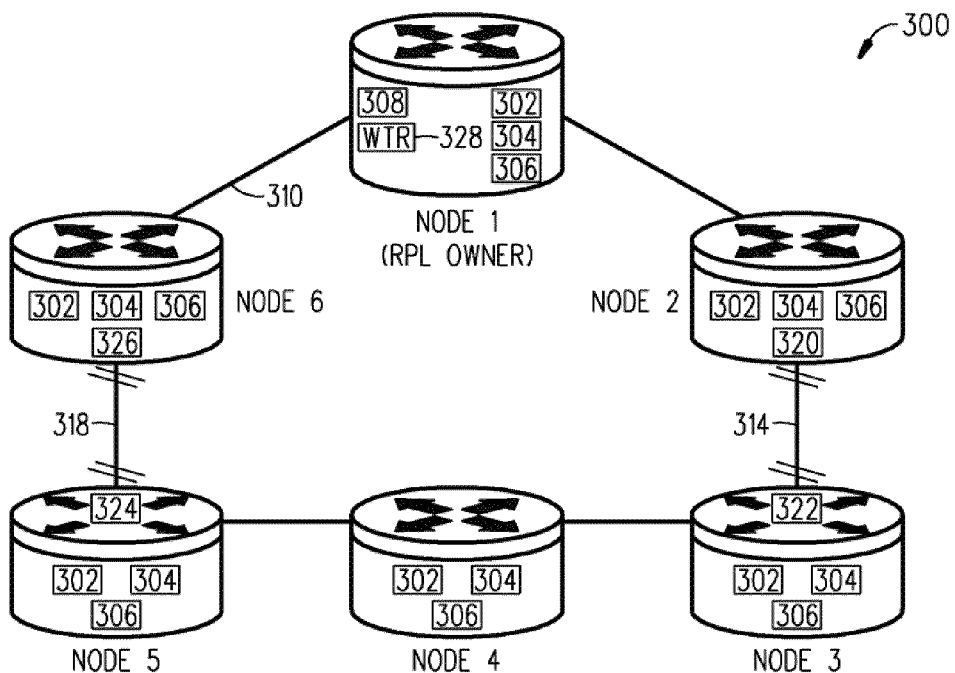
Figure 3H:
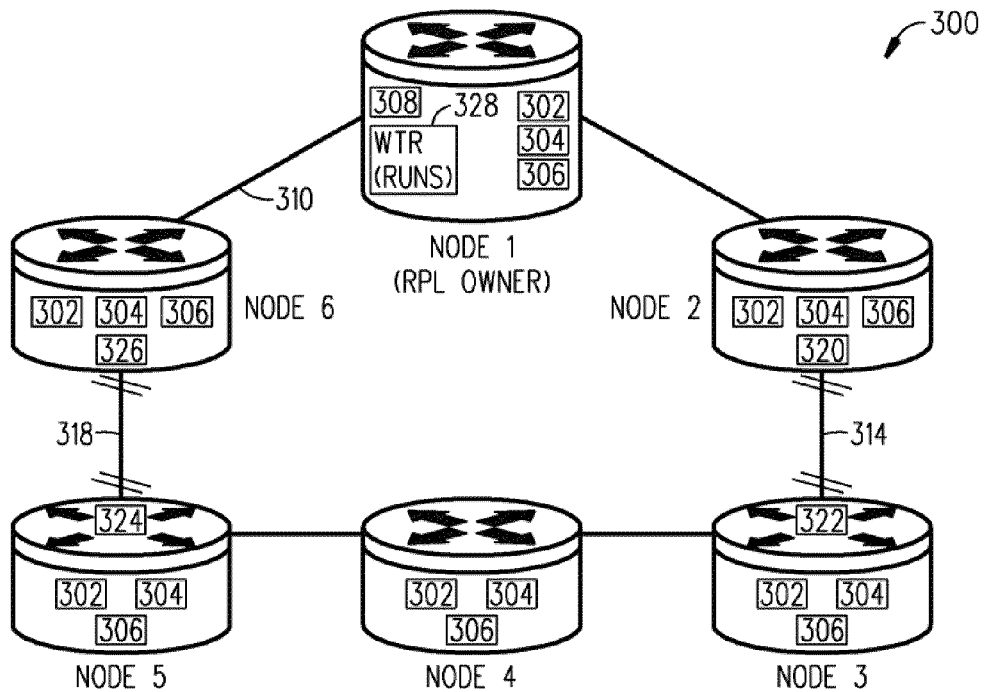
Figure 3I:
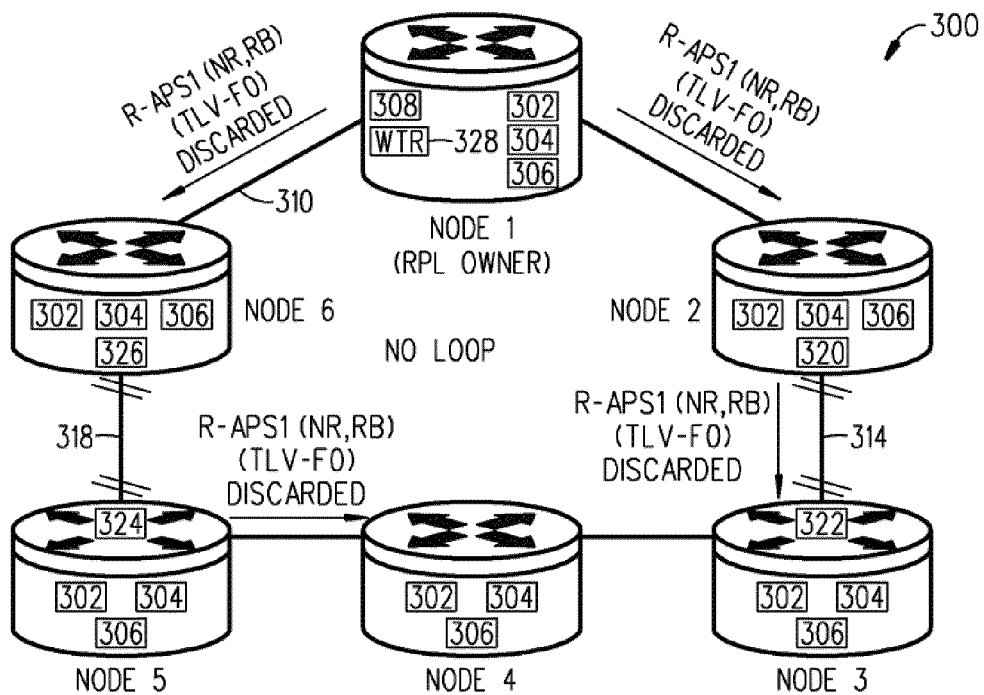
Figure 3J:
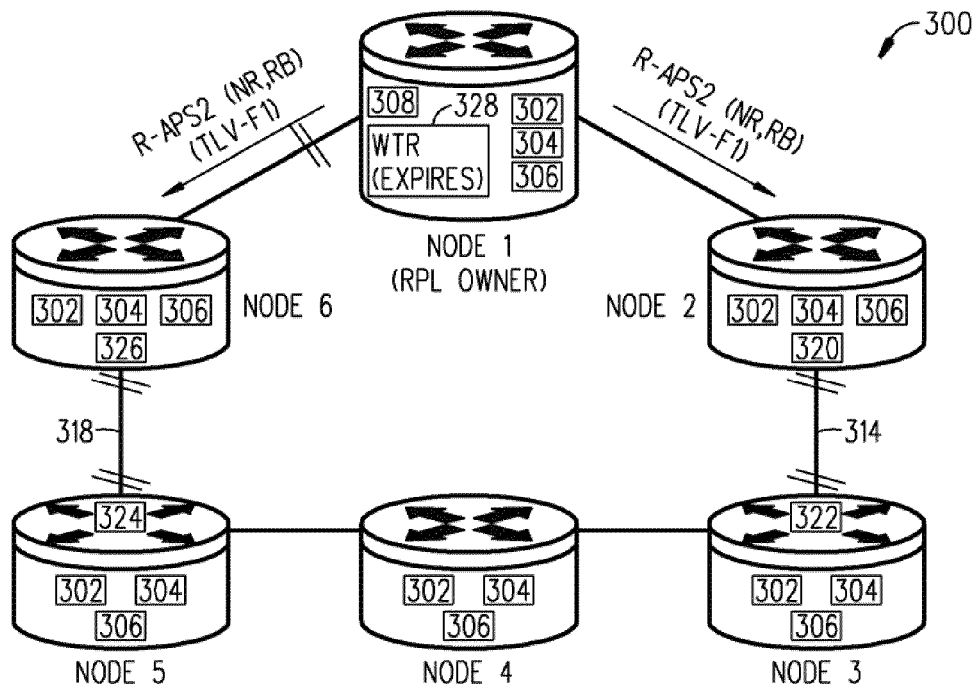
Figure 3K:
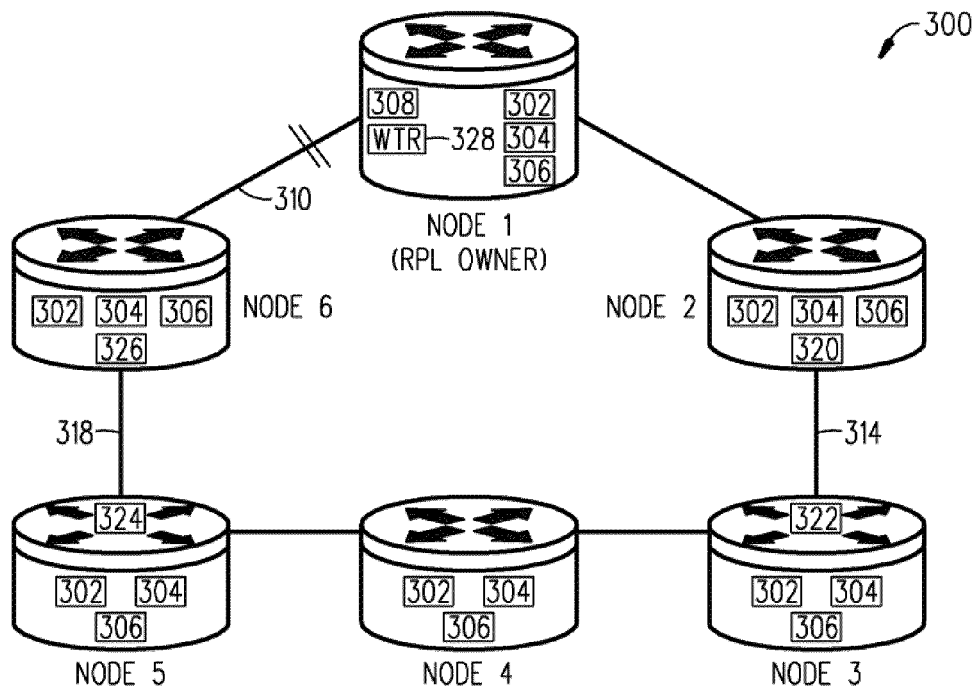
Figure 3L:
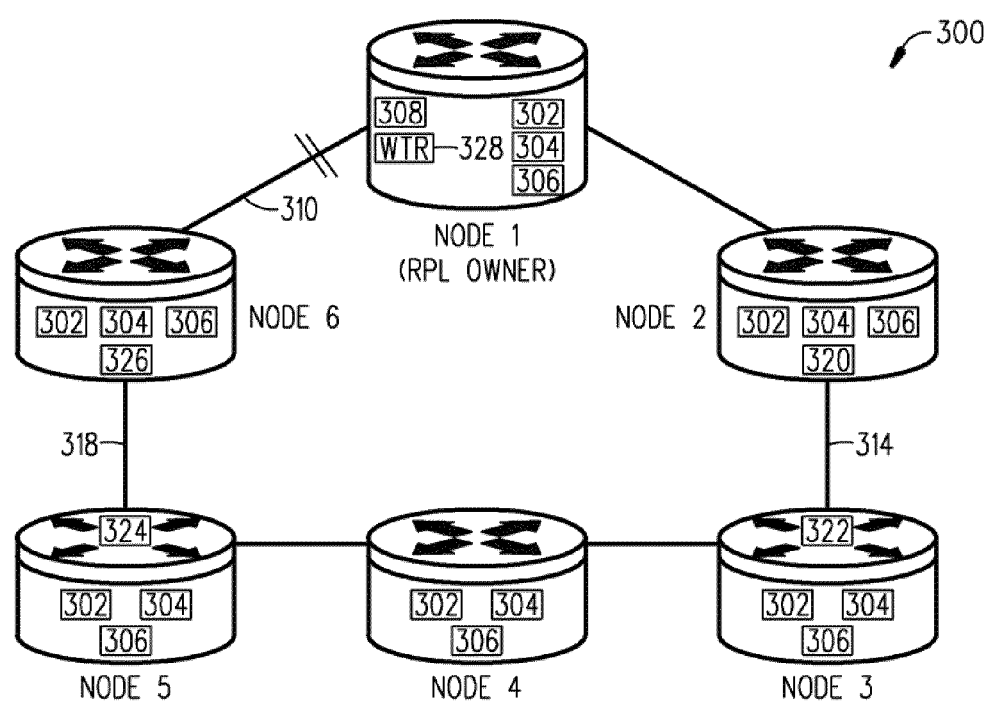

Any non RPL owner node in the protection state shall ignore any R-APS(NR,RB) message if the failure number in the message is strictly inferior than its own. This is to make sure to avoid interpreting old information and causing an undesirable loop (see FIGS. 1J and 1K).

Any non RPL owner node shall update its own failure number with the failure number from any received R-APS message if the failure number in the newly received R-APS message is strictly superior than its own. This is to make sure to have each node using the same biggest possible failure number.

The RPL owner node shall update its own failure number with any failure number in a received R-APS(SF) message, if the failure number in the received R-APS(SF) message is strictly superior than its own.

Referring to FIGS. 2A-2L, there are illustrated several diagrams of an exemplary network 200 at different steps 2A-2L which are used to help describe how a node (e.g., bridge, switch, router) can address the aforementioned loop problem when there is a single link failure in accordance with an embodiment of the present invention. The different steps 2A-2L respectively correspond to FIGS. 2A-2L.

2A. Assume the exemplary network 200 has a ring of six enhanced nodes that are numbered from 1 to 6 and called node 1 to node 6, respectively. The node 1 is the RPL owner. The enhanced nodes 1-6 each have their own processor 202 and a memory 204 that stores processor-executable instructions where the processor 202 interfaces with the memory 204 and executes the processor-executable instructions to implement as needed the aforementioned six principles of operation 206 for extending the protocol of the ITU-T G.8032 standard in accordance with the present invention.

2B. Assume node 1 periodically sends R-APS1 (NR,RB) messages reflecting its idle state, across the ring (as per standard), plus a new TLV carrying the failure number, set to "0" since no failure has been seen yet. Assume node 1 is blocking a port 208 to RPL link 210 to prevent a loop (as per standard). Assume all of the nodes 1-6 are in idle states.

2C. Assume there is a failure 212 on link 214 between node 5 and node 6.

2D. Node 5 and node 6 respectively block ports 216 and 218 on failed link 214 and send R-APS(SF) messages when they transition from the idle state to the protection state (as per standard). In addition, the R-APS(SF) messages have a new TLV carrying the failure number, set to "1" since a failure has been detected. The nodes 5 and 6 also increment their own failure number to "1".

2E. Assume the link 214 is up again between node 5 and node 6. Node 5 and node 6 send R-APS(NR) messages and remain in the protection state (as per standard). In addition, the R-APS(NR) messages have a new TLV carrying the failure number, set to "1" since a failure has been detected.

2F. Assume the RPL owner (node 1) receives the R-APS (SF) message with the TLV carrying the failure number "1" that was sent by node 5 or node 6 during step 2D. The RPL owner (node 1) unblocks the non failed RPL port 208 and goes from the idle state into the protective state. The RPL owner (node 1) also sets its own failure number to "1".

2G. Assume the RPL owner (node 1) receives R-APS(NR) from node 5 or node 6 during step 2E. The RPL owner (node 1) starts a WTR 220 and remains in the protective state (as per the standard).

2H. The WTR timer 220 is still running at the RPL owner (node 1).

2I. Node 5 and node 6 both receive the R-APS1(NR,RB) message from step 2A. The R-APS1(NR,RB) message is discarded and a loop is avoided because the message has a failure number "0" while the current node failure number is "1" (no need of using a guard timer) (compare to FIGS. 1J and 1K).

Steps 2H and 2I are the un-expected sequence of steps due to the delay in node 5 and node 6 receiving the R-APS1(NR, RB) message from step 2A. As can be seen, there is no creation of an undesirable loop nor was there a need to use a guard timer. The following discussion describes the expected sequence of steps 2J-2L that should occur after step 2G. The steps 2J-2L are as follows:

2J. Assume that the WTR 220 expires, the RPL owner (node 1) blocks the RPL port 208 again and goes back to the idle state. The RPL owner (node 1) periodically sends R-APS2(NR,RB) across the ring reflecting its idle state (as per standard), plus the R-APS2(NR,RB) has a new TLV carrying the failure number set to "1" since this failure has been seen.

2K. Node 5 and node 6 receive the R-APS2(NR,RB) messages from step 2J. Node 5 and node 6 do not ignore the R-APS2(NR,RB) messages because they have the TLVs with the failure number of "1" and the current node failure number is "1" (no need of using a guard timer). Thus, node 5 and node 6 unblock the non failed ports 216 and 218 and transition from the protection state to the idle state.

2L. All nodes 1-6 in the "idle" state update their current failure number to "1" which is the same as in the TLV of the R-APS2(NR,RB) messages.

The principles of operation 206 for the proposed extension to the ITU-T G8032 standard in accordance with the present invention also work in case multiple failures occur in the ring of the network 200. Referring to FIGS. 3A-3L, there are illustrated several diagrams of an exemplary network 300 at different steps 3A-3L which are used to help describe how a node (e.g., bridge, switch, router) can address the aforementioned loop problem when there are multiple link failures in accordance with an embodiment of the present invention. The different steps 3A-3L respectively correspond to FIGS. 3A-3L.

3A. Assume the exemplary network 300 has a ring of six enhanced nodes that are numbered from 1 to 6 and called node 1 to node 6, respectively. The node 1 is the RPL owner. The enhanced nodes 1-6 each have their own processor 302 and a memory 304 that stores processor-executable instructions where the processor 302 interfaces with the memory 304 and executes the processor-executable instructions to implement as needed the aforementioned six principles of operation 306 for extending the protocol of the ITU-T G.8032 standard in accordance with the present invention.

3B. Assume node 1 periodically sends R-APS1 (NR,RB) messages reflecting its idle state, across the ring (as per standard), plus a new TLV carrying the failure number, set to "0" since no failure has been seen yet. Assume node 1 is blocking a port 308 to RPL link 310 to prevent a loop (as per standard). Assume all of the nodes 1-6 are in idle states.

3C. Assume there is a failure 312 on link 314 between node 2 and node 3 and a failure 316 on link 318 between node 5 and node 6.

3D. Node 2 and node 3 respectively block ports 320 and 322 on failed link 314 and send R-APS(SF) messages when they transition from the idle state to the protection state (as per standard). In addition, the R-APS(SF) messages have a new TLV carrying the failure number, set to "1" since a failure has been detected. Likewise, node 5 and node 6 respectively block ports 324 and 326 on failed link 318 and send R-APS (SF) messages when they transition from the idle state to the protection state (as per standard). In addition, these R-APS (SF) messages have a new TLV carrying the failure number, set to "1" since a failure has been detected. The nodes 2, 3, 5 and 6 also increment their own failure number to 1.

3E. Assume the link 314 is up again between node 2 and node 3. Node 2 and node 3 send R-APS(NR) messages and remain in the protection state (as per standard). In addition, these R-APS(NR) messages have a new TLV carrying the failure number, set to "1" since a failure has been detected. Likewise, assume the link 318 is up again between node 5 and node 6. Node 5 and node 6 send R-APS(NR) messages and remain in the protection state (as per standard). In addition, these R-APS(NR) messages have a new TLV carrying the failure number, set to "1" since a failure has been detected. From this state, nodes 2, 3, 5 and 6 receiving a R-ASP(NR, RB) will perform the following action (among other not related to present discussion) to "unblock both ports" (as per standard).

3F. Assume the RPL owner (node 1) receives the R-APS (SF) message with the TLV carrying the failure number "1" that was sent by node 5 or node 6 during step 3D. The RPL owner (node 1) unblocks the non failed RPL port 308 and goes from the idle state into the protective state. The RPL owner (node 1) also sets its own failure number to 1. The RPL owner (node 1) would perform the same action if it received the R-APS (SF) message with the TLV carrying the failure number "1" that was sent by node 2 or node 3 during step 3D.

3G. Assume the RPL owner (node 1) receives R-APS(NR) from node 5 or node 6 during step 3E. The RPL owner (node 1) starts a WTR 328 and remains in the protective state (as per the standard). The RPL owner (node 1) would perform the same action if it received the R-APS (NR) message with the TLV carrying the failure number "1" that was sent by node 2 or node 3 during step 3E.

3H. The WTR timer 328 is still running at the RPL owner (node 1).

3I. Node 5 and node 6 both receive the R-APS1(NR,RB) message from step A. The R-APS1(NR,RB) message is discarded and a loop is avoided because the message has a failure number "0" while the current node failure number is "1" (no need of using a guard timer) (compare to FIGS. 1J and 1K). Node 2 and node 3 would perform in the same manner.

Steps 3H and 3I are the un-expected sequence of steps due to the delay in node 5 and node 6 (or node 2 and 3) receiving the R-APS1(NR,RB) message from step 3A. As can be seen, there is no creation of an undesirable loop nor was there a need to use a guard timer. The following discussion describes the expected sequence of steps 3J-3L that should occur after step 3G. The steps 3J-3L are as follows:

3J. Assume that the WTR 220 expires, the RPL owner (node 1) blocks the RPL port 308 again and goes back to the idle state. The RPL owner (node 1) periodically sends R-APS2(NR,RB) across the ring reflecting its idle state (as per standard), plus the R-APS2(NR,RB) has a new TLV carrying the failure number set to "1" since this failure has been seen.

3K. Node 5 and node 6 receive the R-APS2(NR,RB) messages from step 3J. Node 5 and node 6 do not ignore the R-APS2(NR,RB) messages because they have the TLVs with the failure number of "1" and the current node failure number is "1" (no need of using a guard timer). Thus, node 5 and node 6 unblock the non failed ports 324 and 326 and transition from the protection state to the idle state. Node 2 and node 3 perform in the same manner and unblock the non failed ports 320 and 322 and transition from the protection state to the idle state.

3L. All nodes 1-6 in the "idle" state update their current failure number to "1" which is the same as in the TLV of the R-APS2(NR,RB) messages.

How to loop from the maximum failure number to 0 again gracefully while still allowing the enhancement to the protocol to work has not yet been specified. One possible solution could involve having the RPL node (node 1) resetting the failure number on all nodes through a specific new TLV just before reaching this maximum failure number. As can be seen, the present invention is relatively simple to implement, transparent to the user, and will always avoid the creation of the undesirable loop.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method implemented by a node for preventing a creation of a loop within a ring of a network, said method comprising the steps of:
    keeping track of a failure number in the ring of the network;
    incrementing the kept track failure number when detecting a local failure;
    updating the kept track failure number with a failure number from a message received from another node in the ring if the failure number in the received message is larger than the kept track failure number; and
    discarding, while in a protection state, a message received from a ring protection link owner node if the failure number in the received message is less than the kept track failure number, wherein the discarding of the received message from the ring protection link owner node prevents any possible interpretation of old information within the received message which causes the creation of the loop within the ring of the network.

2. The method of claim 1, wherein the updating step further includes the received message being a R-APS message and the failure number being located in a type value length element.

3. The method of claim 1, wherein the discarding step further includes the received message being a R-APS (NR, RB) message and the failure number being located in a type value length element.

4. The method of claim 1, further comprising the step of adding the kept track failure number to a message that is sent to other nodes.

5. The method of claim 4, wherein the adding step further includes the message being a R-APS message and the kept track failure number being located in a type value length element.

6. A method implemented by a non-ring protection link owner node for preventing a creation of a loop within a ring of a network, said method comprising the steps of:
    keeping track of a failure number in the ring of the network;
    incrementing the kept track failure number when detecting a local failure; and
    updating the kept failure number to have the same value as any failure number in a message received from another node that transitioned from an idle state to a protection state.

7. The method of claim 6, wherein the updating step further includes the message being a R-APS (SF) message and the failure number being located in a type value length element.

8. A non-ring protection link owner node that prevents a creation of a loop within a ring of a network, said non-ring protection link owner node comprising:
    a processor;
    a memory that stores processor-executable instructions where the processor interfaces with the memory and executes the processor-executable instructions to enable the following:
        keep track of a failure number in the ring of the network;
        increment the kept track failure number when detecting a local failure;
        update the kept track failure number with a failure number from a message received from another node in the ring if the failure number in the received message is larger than the kept track failure number; and
        discard, while in a protection state, a message received from a ring protection link owner node if the failure number in the received message is less than the kept track failure number, wherein the discarding of the received message from the ring protection link owner node prevents any possible interpretation of old information within the received message which causes the creation of the loop within the ring of the network.

9. The non-ring protection link owner node of claim 8, wherein the update operation further includes the received message being a R-APS message and the failure number being located in a type value length element.

10. The non-ring protection link owner node of claim 8, wherein the discard operation further includes the received message being a R-APS (NR, RB) message and the failure number being located in a type value length element.

11. The non-ring protection link owner node of claim 8, wherein the processor executes the processor-executable instructions to add the kept track failure number to a message that is sent to other nodes.

12. The non-ring protection link owner node of claim 11, wherein the add operation further includes the message being a R-APS message and the kept track failure number being located in a type value length element.

13. A non-ring protection link owner node that prevents a creation of a loop within a ring of a network, said non-ring protection link owner node comprising:
    a processor;
    a memory that stores processor-executable instructions where the processor interfaces with the memory and executes the processor-executable instructions to enable the following:
        keep track of a failure number in the ring of the network;
        increment the kept track failure number when detecting a local failure; and
        update the kept failure number to have the same value as any failure number in a message received from another node that transitioned from an idle state to a protection state.

14. The ring protection link owner node of claim 13, wherein the update operation further includes the message being a R-APS (SF) message and the failure number being located in a type value length element.

15. A network, comprising:
    a non-ring protection link owner node that includes a processor and a memory that stores processor-executable instructions where the processor interfaces with the memory and executes the processor-executable instructions to enable the following:
        keep track of a failure number in a ring;
        increment the kept track failure number when detecting a local failure;

update the kept track failure number with a failure number from a message received from another node in the ring if the failure number in the received message is larger than the kept track failure number; and discard, while in a protection state, a message received from a ring protection link owner node if the failure number in the received message is less than the kept track failure number, wherein the discarding of the received message from the ring protection link owner node prevents any possible interpretation of old information within the received information which causes the creation of the loop within the ring of the network; and the ring protection link owner node includes a processor and a memory that stores processor-executable instructions where the processor interfaces with the memory and executes the processor-executable instructions to enable the following:

keep track of the failure number in the ring;

increment the kept track failure number when detecting a local failure; and update the kept failure number with any failure number in a message received from one of the non-ring protection link owner nodes that transitioned from an idle state to a protection state.

16. The network of claim 15, wherein the non-ring protection link owner node adds the kept track failure number to message that is sent to other nodes including the ring protection link owner node.

* * * * *